United States Patent

De Claire et al.

[15] 3,653,711
[45] Apr. 4, 1972

[54] DRIP MOLDING FOR A CONVERTIBLE TOP

[72] Inventors: James H. De Claire, Mt. Clemens; Floyd I. Dully, Detroit; Neil A. Hull, Birmingham, all of Mich.

[73] Assignee: General Motors Corporation, Detroit, Mich.

[22] Filed: May 4, 1970

[21] Appl. No.: 34,446

[52] U.S. Cl. ................................296/107, 52/11, 296/135
[51] Int. Cl. ...........................................................B60j 7/00
[58] Field of Search ...............296/28 R, 116, 107, 135, 137; 52/11

[56] References Cited

UNITED STATES PATENTS

| | | | |
|---|---|---|---|
| 1,823,541 | 9/1931 | Herron | 296/135 |
| 2,524,171 | 10/1950 | Karsted | 296/107 |
| 2,572,592 | 10/1951 | Brandt et al. | 296/135 X |
| 2,686,691 | 8/1954 | Burrell | 296/107 |

Primary Examiner—Benjamin Hersh
Assistant Examiner—Winston H. Douglas
Attorney—W. E. Finken, Herbert Furman and R. L. Phillips

[57] ABSTRACT

A side drip molding for attachment to the side rail of a frame that supports a convertible top on a vehicle body. The drip molding has a gutter portion and two retaining flange portions molded from a flexible material. The drip molding includes a clip portion formed as part of one of the two retaining flanges. The clip portion has a lip portion and rib portion to mount and hold the drip molding on the side rail.

3 Claims, 2 Drawing Figures

PATENTED APR 4 1972 3,653,711

INVENTORS.
James H. DeClaire,
BY Floyd I. Dully &
Neil A. Hull
Ronald L. Phillips
ATTORNEY

DRIP MOLDING FOR A CONVERTIBLE TOP

The present invention generally relates to drip moldings for a convertible top and more particularly to a drip molding requiring no separate clips for mounting on a vehicle.

The drip molding according to this invention is a one piece structure that includes a gutter portion and two retaining flange portions. A U-shaped clip portion is formed as part of one of the retaining flange portions allowing the drip molding to be easily mounted on a frame supporting a convertible top without the use of separate clips. A feature of the present invention is that it provides a drip molding of a flexible material which can be inexpensively and easily manufactured in large quantities.

This and other features and advantages of the present invention will be readily apparent from the following specification and drawing wherein.

Figure 1:
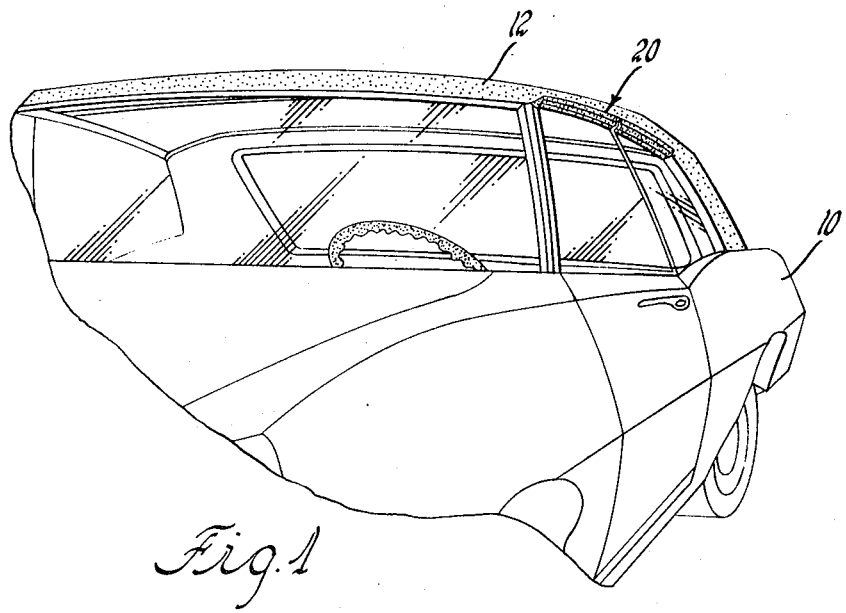
FIG. 1 is a partial perspective view of a convertible type vehicle body having a drip molding according to this invention.
Figure 2:
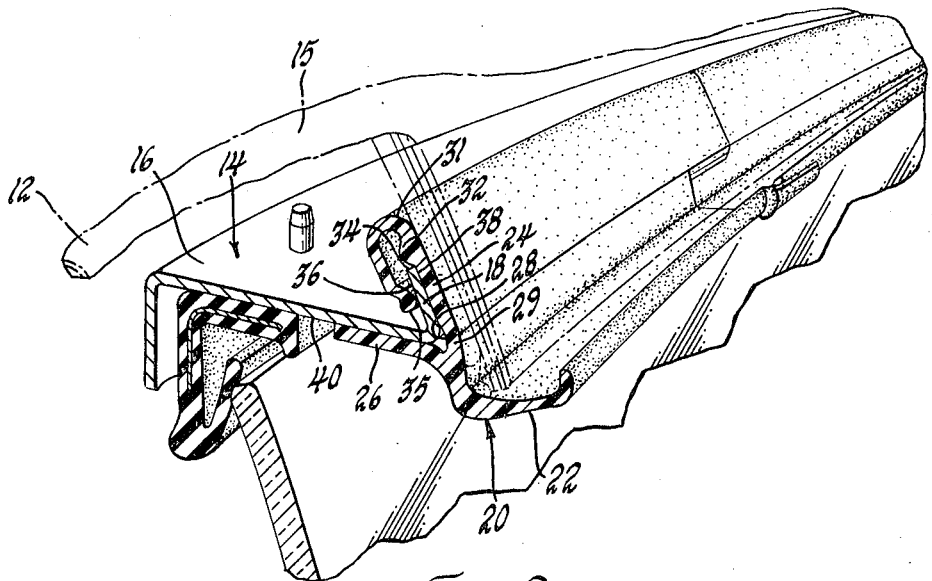
FIG. 2 is an enlarged view with parts in section of the drip molding shown in FIGURE 1.

Referring now to FIGURE 1 of the drawing, a vehicle body 10 has a conventional convertible top 12 mounted thereon. As shown in FIGURE 2, the frame of the top includes a side rail 14 on each side of the vehicle which supports a top fabric 15. Each side rail 14 includes a laterally extending base portion 16 terminating in an upwardly and inwardly extending terminal leg or side flange 18 that is at an acute angle to base portion 16.

A drip molding 20 according to this invention is mounted on the side of the side rail 14. The drip molding 20 is formed in one piece of a flexible material such as flexible plastic. The drip molding 20 includes a gutter portion 22 and two retaining flange portions 24 and 26 extending longitudinally for the length of the drip molding 20. Retaining flanges 24 and 26 of the drip molding 20 are formed with an included angle between them which is less than the acute angle between the side flange portion 18 and the base portion 16 of the side rail 14. A notch 28 is formed at the intersection of the retaining flanges 24 and 26 to provide a reduced cross sectional area portion 29 at the juncture of the retaining flanges 24 and 26. The notch 28 thus provides a flexible joint allowing the retaining flanges 24 and 26 to pivot at their juncture upon mounting of the drip molding 20. Thus the notch 28 prevents permanent distortion of the retaining flanges 24 and 26. A clip portion designated at 31 having a U-shape is formed as part of the retaining flange 24 along the length thereof. The clip portion 31 is formed with a rib 32 extending longitudinally the length of the drip molding 20. The rib 32 engages the edge 34 of side flange 18 and maintains the drip molding 20 against a downward force applied to the gutter portion 22. At the extremity of clip portion 31 a lip portion 35 is formed. The lip portion 35 engages the inner wall 36 of side flange 18 upon mounting.

The drip molding 20 is mounted upon the side rail 14 by hooking clip portion 31 over side flange 18 and swinging the drip molding 20 clockwise to spread the retaining flanges 24 and 26 apart to fit over the larger included angle between the side flange 18 and the base portion 16 of the side rail 14. Clip portion 31 clamps the external surfaces 36 and 38 of the side flange 18 since the normal space between lip portion 35 and the opposite leg of the clip portion 31 is less than the thickness of side flange 18. In the attached position, the retaining flanges 24 and 26 of the drip molding 20 fully engage the external surface 38 of the side flange portion 18 and the outer surface 40 of base portion 16, respectively. In this manner, the retaining flanges 24 and 26 serve to locate and position the drip molding 20 with respect to the frame means that supports the convertible top 12.

Thus the invention provides a drip molding that is easily mounted upon a convertible type vehicle and requires no other parts to affix it thereto.

What is claimed is:

1. In combination with a vehicle convertible top including a side rail for extending longitudinally of a vehicle in a raised position of the top and having a side flange portion extending angularly to a base flange portion in a generally V-shaped configuration, a drip molding comprising, a gutter portion, a pair of retaining flange portions integrally connected to the gutter portion and normally defining an included angle less than the included angle defined by the side flange portion and base flange portion of the rail, the retaining flange portions being flexed away from each other to increase the included angle therebetween and respectively seat against the outer sides of the side flange portion and base flange portion of the rail while covering the juncture thereof, and means on one of the retaining flange portions engaging the inner side of the respective rail flange portion and cooperating with the one retaining flange portion to clamp the rail flange portion therebetween and position the drip molding relative to the rail.

2. The combination of claim 1 wherein the means includes an elongated U-shaped clip portion having a first leg joined to the one retaining flange portion and a terminal leg slidably engaging the inner side of the respective rail flange portion.

3. The combination of claim 2 wherein one of the legs includes an elongated rib engaging the elongated edge of the respective rail flange portion to further position the drip molding relative to the rail.

* * * * *